United States Patent
Giorgini

(10) Patent No.: US 8,585,545 B2
(45) Date of Patent: Nov. 19, 2013

(54) METHOD OF CONTROLLING AN ELECTRO-ACTUATED CLUTCH FOR DETERMINING THE CLOSING POSITION

(75) Inventor: Stefano Giorgini, Bologna (IT)

(73) Assignee: Magneti Marelli S.p.A., Corbetta (IT)

( * ) Notice: Subject to any disclaimer, the term of this patent is extended or adjusted under 35 U.S.C. 154(b) by 937 days.

(21) Appl. No.: 12/637,675

(22) Filed: Dec. 14, 2009

(65) Prior Publication Data

US 2010/0160112 A1   Jun. 24, 2010

(30) Foreign Application Priority Data

Dec. 29, 2008   (EP) .................................. 08425818

(51) Int. Cl.
*B60W 10/00* (2006.01)
(52) U.S. Cl.
USPC .......................................................... 477/87
(58) Field of Classification Search
USPC .......... 475/129; 477/121, 138, 145, 146, 150; 192/30 W, 111.1, 111.12, 70.252
See application file for complete search history.

(56) References Cited

U.S. PATENT DOCUMENTS

| | | | | |
|---|---|---|---|---|
| 5,255,760 A * | 10/1993 | Lamb et al. | .............. | 188/1.11 L |
| 5,337,874 A | 8/1994 | Oltean et al. | | |
| 8,113,327 B2 * | 2/2012 | Dutier et al. | .................. | 192/48.9 |
| 8,297,424 B2 * | 10/2012 | Bradley | .................... | 192/48.612 |
| 2002/0096416 A1 * | 7/2002 | Otto | .......................... | 192/85 CA |
| 2003/0164274 A1 * | 9/2003 | Feldhaus et al. | .............. | 192/48.8 |
| 2004/0188218 A1 | 9/2004 | Berger et al. | | |

FOREIGN PATENT DOCUMENTS

| | | |
|---|---|---|
| DE | 10065023 A1 | 7/2002 |
| DE | 102007015679 A | 10/2008 |
| EP | 1209378 A | 5/2002 |
| EP | 1826444 A | 8/2007 |
| GB | 2293426 A | 3/1996 |
| GB | 2293426 A | 6/2002 |

OTHER PUBLICATIONS

European Patent Office, European Search Report for application EP 08425818, completed on Jun. 8, 2009.

* cited by examiner

*Primary Examiner* — David D Le
*Assistant Examiner* — David J Hlavka
(74) *Attorney, Agent, or Firm* — FSP LLC

(57) ABSTRACT

A method of controlling an electro-actuated clutch in an internal combustion engine, the clutch including a clutch mechanism, an electric motor for actuating the clutch mechanism, and a mechanical transmission, which is interposed between the electric motor and the clutch mechanism. During a manufacturing phase of the system, a detachable connection is established in the mechanical transmission, wherein a first element simply rests on a second element to divide the electro-actuated clutch into a first part, arranged upstream of the detachable connection, and a second part, arranged downstream of the detachable connection. During operation, a first position signal generated by a first position sensor mechanically connected to a point of the first portion of the electro-actuated clutch is read, as is a second position signal generated by a second position sensor mechanically connected to a point of the second portion of the electro-actuated clutch. The first position signal is compared with the second position signal. A position in which the first position signal starts differing from the second position signal is recognized, and an estimate made of a closing position of the clutch mechanism coinciding with the position in which the first position signal starts differing from the second position signal.

2 Claims, 1 Drawing Sheet

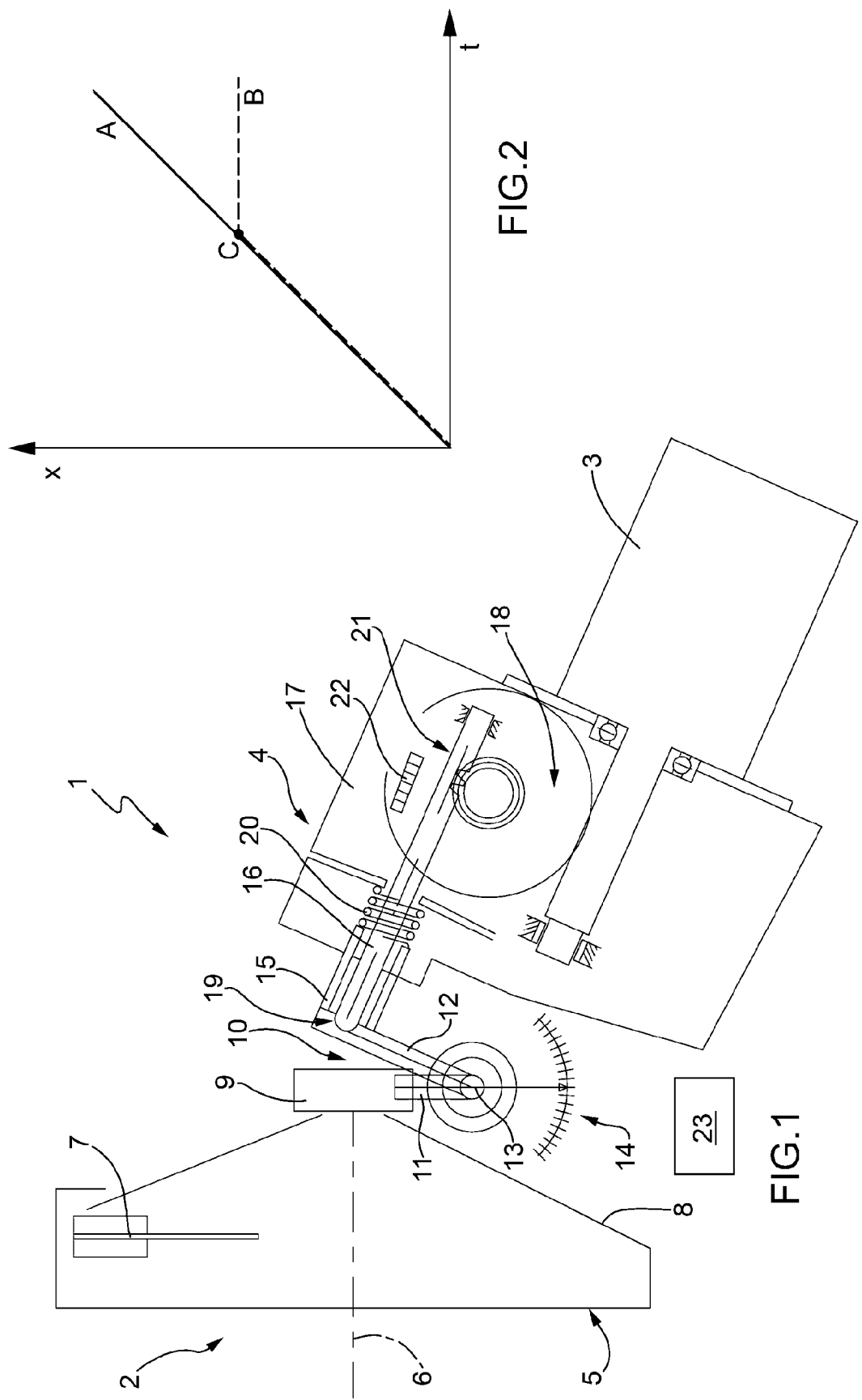

METHOD OF CONTROLLING AN ELECTRO-ACTUATED CLUTCH FOR DETERMINING THE CLOSING POSITION

PRIORITY

This application claims priority under 35 USC 119 AND-OR 365 to EUROPE application no. 08425818.5 filed on Dec. 29, 2008.

TECHNICAL FIELD

The present invention relates to a method of controlling an electro-actuated clutch for determining the closing position.

BACKGROUND ART

Automated Manual Transmissions (AMTS) are increasingly more common in modern motor vehicles provided with internal combustion engines. An AMT is an automation device which operates on the traditional manual gearbox by opening and closing the clutch, by selecting, engaging and disengaging the gears by means of respective actuators. These controls are electronically actuated by a transmission control unit, and by operating on the manual gearbox of a motor vehicle as a driver would, this actuation allows the driver to shift gear either automatically or sequentially without using the clutch.

Specifically, an electro-actuated manual transmission comprises an electro-actuated clutch, which is in turn provided with a known clutch mechanism, with an electric actuator for actuating the clutch mechanism and with a mechanical transmission, which is interposed between the electric motor and the clutch mechanism for transmitting the motion.

As known, the clutch mechanism is provided with a basket which accommodates a clutch plates pack therein, the plates being coupled to the basket by means of one or more springs. The control of the electric motor allows to move the clutch mechanism between a closing position (or retracted resting position), in which the clutch plate pack is pressed to allow the transmission of a driving torque, and an opening position (or advanced operating position).

As time goes by, and as the kilometers covered by the motor vehicle increase, the clutch plate pack tends to be worn and consumed, thus also determining a displacement of the closing and opening positions of the clutch mechanism.

In order to ensure that the closing position of the clutch mechanism does not vary from the point of view of the transmission control unit, a hydraulic or mechanical compensating device needs to be inserted into the mechanical transmission to recover the wear of the clutch plate pack; however, the insertion of a compensating device has the drawback of considerably increasing production costs, assembly time and overall volume of the electro-actuated clutch.

DISCLOSURE OF INVENTION

It is the object of the present invention to provide a method of controlling an electro-actuated clutch for determining the closing position, which is free from the above-described drawbacks and, specifically, is easy and cost-effective to be implemented.

According to the present invention, a method of controlling an electro-actuated clutch is provided as claimed in the attached claims.

BRIEF DESCRIPTION OF THE DRAWINGS

The present invention will now be described with reference to the accompanying drawings which illustrate a non-limitative embodiment thereof, in which:

FIG. 1 is a diagrammatic view of an electro-actuated clutch driven by a control unit which implements the control method of the present invention; and FIG. 2 is a graph which shows the evolution over time of two signals generated by two position sensors of the control unit in FIG. 1.

PREFERRED EMBODIMENTS OF THE INVENTION

In FIG. 1, numeral 1 indicates as a whole an electro-actuated clutch for a motor vehicle (not shown) comprising a clutch mechanism 2, an electric actuator 3 for operating the clutch mechanism 2 and a mechanical transmission 4, which is interposed between the electric motor 3 and the clutch mechanism 2 for controlling the clutch mechanism 2 itself due to the action of the electric motor 3.

The clutch mechanism 2 comprises, in turn, a basket 5 which has a longitudinal axis 6 and accommodates a clutch plates pack 7 therein, which plates are coupled to the basket 5 in an axially sliding manner with respect to the basket 5 itself.

The basket 5 also partially accommodates a cup spring 8, better known as a Bellville spring, which is coaxial to the longitudinal axis 6, is angularly fixed with respect to the basket 5, and is axially movable under the bias of the mechanical transmission 4 controlled by the electric motor 3. In particular, the control of the electric motor 3 allows to move the clutch mechanism 2 between a closing position (or retracted resting position), in which the Belleville spring 8 presses the clutch plate pack 7 to allow the transmission of a driving torque, and an opening position (or advanced operating position). A first end of the Belleville spring 8 is accommodated within the basket 5, while a second end of the Bellville spring 8 is coupled to a thrust bearing 9 of the mechanical transmission 4, which in use and under the bias of the electric motor 3, is axially moved to press the Belleville spring 8 itself; therefore, the Belleville spring 8 finally allows to keep the contact between the clutch mechanism 2 and the thrust bearing 9.

The mechanical transmission 4, as shown in FIG. 1, in addition to the thrust bearing 9 also comprises a lever 10, which is provided with two arms, indicated by numerals 11 and 12, respectively, and with a position sensor 14 at its fulcrum 13. The arm 11 is connected to the thrust bearing 9 with a first end, and to the arm 12 with a second end, which arm 12 is, in turn, connected to a tubular housing 15 which acts as a guiding element for a push rod 16.

The push rod 16 is accommodated within a supporting frame 17 and is controlled by the electric motor 3 by means of a series of gears 18 arranged in cascade, also within the supporting frame 17. At one end 19 thereof, the push rod 16 establishes a non-bound connection which may be detached with the arm 12 of the lever 10; in other words, in use, the push rod 16 is free to slide within the tubular housing 15 and is movable between a first position, in which it is arranged resting on the arm 12, and a second position, in which it is disconnected from the arm 12. There is provided a spring 20 which exerts an elastic bias on the tubular housing 15, which is opposite to the elastic bias of the Belleville spring 8 and pushes the lever 10, integral with the tubular housing, against the Belleville spring 8. Furthermore, at one end 21, the push rod 16 is connected to a position sensor 22 which is able to detect the rotation of the electric motor 3 actuating the clutch mechanism 2.

Thus, in conclusion, the position sensor 14 is integral with the thrust bearing 9 and the clutch mechanism 2, while the position sensor 22 measures the rotation of the electric motor 3 actuating the clutch mechanism 2.

When the clutch mechanism 2 in completely closed, the thrust bearing 9 and the lever 10 integral thereto immediately stop, because the clutch plates 7 may not be physically pressed any further. The electric motor 3 continues to rotate and determines a progressive separation of the end 19 of the rod 16 from the arm 12. Therefore, once the closing position of the clutch mechanism 2 has been reached, the position sensor 14 integral with the lever 10 no longer detects any movement, while the sensor 22 integral with the push rod 16 continues to detect the movement of the push rod 16 which, by sliding within the tubular housing, gradually separates from the lever 10, as much as allowed. As shown in greater detail in FIG. 2, letter A indicates the time trend of the signal detected by the position sensor 14, while letter B indicates the time trend of the signal detected by the position sensor 22. As clearly shown in FIG. 2, the two signals A and B have the same trend to a point, indicated by letter C, from which the trend of the two signals A and B diverges. Specifically, the two signals A and B remain coherent for the whole time in which a contact is established between the push rod 16 and the arm 12 of the lever 10; while the two signals A and B also have different trends from the moment in which a connection between the push rod 16 and the arm 12 is no longer established.

Point C in the graph in FIG. 2 precisely identifies the point from which the contact between the electric motor 3 and the clutch connection 2 is no longer established, i.e. it represents the closing moment of the clutch mechanism 2.

An electronic control unit 23 of the electro-actuated clutch 1, which is connected to the two sensors 14 and 22, may thus recognize the closing point of the clutch mechanism 2, thus determining the moment in which the signals detected by the two sensors 14 and 22 start diverging. As the actual closing point of the clutch mechanism 2 may be detected for each control of clutch 1, the wear of the clutch plate pack 7 may be taken into account because, from the update of the actual closing point, the whole transmissibility function of the clutch mechanism 2 (i.e. the function which associates the position of the clutch mechanism 2 with the driving torque transmitted by the clutch mechanism 2) may be updated.

It is apparent that being able to identify the closing point of the clutch mechanism 2 is very important for controlling the electro-actuated clutch 1, especially because the closing point is not kept constant for the whole life of the electro-actuated clutch 1, but over time this point varies due to the wear of the clutch plates pack 7. Furthermore, when the clutch mechanism 2 is assembled, the Belleville spring 8 is assembled so that the preload, i.e. the force which tends to press the clutch plates pack 7, is such to ensure the engagement of the clutch under any condition of wear of the plates 7 themselves, but the wear of the plates 7 results however in a displacement of the position of the Belleville spring 8 over the time which affects, in turn, the closing position of the clutch mechanism 2.

According to a variant (not shown), the position sensor 14 is arranged on the thrust bearing 9.

According to a further embodiment (not shown), the position sensor 22, such as an encoder, is connected to a free end of the shaft of the electric motor 3.

It is thus apparent that the two position sensors, indicated by numerals 14 and 22 respectively, may be placed at different points of the mechanical transmission 4; the sole condition that needs to be fulfilled in all cases is that the position sensor 14 is to be arranged downstream of the detachable connection which is established between the lever 10 and the push rod 16 in order to detect the position of the clutch mechanism 2, while the position sensor 22 needs always to be upstream of this detachable connection provided for reading the rotation of the electric motor 3. The other possible configurations also allow to recognize the closing point of the clutch mechanism 2, which coincides with the position in which the first signal of position A starts differing from the second signal of position B.

It is worth noting that the closing point of the clutch mechanism 2 is determined during each actuation of the clutch mechanism 2 itself; therefore, the electronic control unit 23 of the electro-actuated clutch 1 has a high number of possible measurements of the opening point of the clutch mechanism 2, and therefore statistic analyses may be applied to such a high number of measurements to considerably reduce the effect of accidental errors.

The above-described control method has many advantages and in particular allows to precisely recognize the closing point of the clutch mechanism 2 during each actuation of the clutch mechanism 2 itself, and thus allows to avoid the insertion of a compensating device for recovering the wear of the clutch plate pack 7. The recognition of the closing point is made possible by simply adding a position sensor as compared to the occurrence in a corresponding standard electro-actuated clutch. This all translates into a considerable reduction of costs for producing the electro-actuated clutch 1, and into an increase of the safety level since the signals A and B of the two position sensors 14 and are partially redundant. In other words, when the clutch mechanism 2 transmits a driving torque for controlling the electric motor 3, either signal A or B of the two position sensors 14 and 22 may be used indiscriminately, and such a redundancy allows both a cross-check, for determining possible faults of either of the two position sensors 14 and 22, and a recovery operation using a single position sensor 14 or 22 when the other position sensor 22 or 14 is not properly working.

The invention claimed is:

1. A method of controlling an electro-actuated clutch in an internal combustion engine, said clutch comprises a clutch mechanism, an electric motor for actuating the clutch mechanism, and a mechanical transmission, which is interposed between the electric motor and the clutch mechanism; the method comprising:

establishing, during a manufacturing phase of the system, a detachable connection in the mechanical transmission, wherein a first element simply rests on a second element to divide the electro-actuated clutch into a first part, arranged upstream of the detachable connection, and a second part, arranged downstream of the detachable connection;

reading a first position signal generated by a first position sensor mechanically connected to a point of the first portion of the electro-actuated clutch;

reading a second position signal generated by a second position sensor mechanically connected to a point of the second portion of the electro-actuated clutch;

comparing the first position signal with the second position signal;

recognizing a position in which the first position signal starts differing from the second position signal; and estimating a closing position of the clutch mechanism coinciding with the position in which the first position signal starts differing from the second position signal.

2. A system including an electro-actuated clutch in an internal combustion engine, said clutch comprises a clutch mechanism, an electric motor for actuating the clutch mechanism, and a mechanical transmission, which is interposed between the electric motor and the clutch mechanism; the system comprising:
- a detachable connection in the mechanical transmission, wherein a first element simply rests on a second element to divide the electro-actuated clutch into a first part, arranged upstream of the detachable connection, and a second part, arranged downstream of the detachable connection;
- a first position sensor mechanically connected to a point of the first portion of the electro-actuated clutch configured to generate a first position signal;
- a second position sensor mechanically connected to a point of the second portion of the electro-actuated clutch configured to generate a second position signal;
- a controller configured to compare the first position signal with the second position signal and to recognize a position in which the first position signal starts differing from the second position signal, and to estimate a closing position of the clutch mechanism coinciding with the position in which the first position signal starts differing from the second position signal.

* * * * *